US012668139B2

(12) United States Patent
Zhao

(10) Patent No.: US 12,668,139 B2
(45) Date of Patent: Jun. 30, 2026

(54) AUTOMATIC POSITIONING AND INTERLOCK SYSTEM FOR CONDUCTIVE AUTOMATED CONNECTION DEVICE ON THE CHARGING INFRASTRUCTURE

(71) Applicant: Apollo Autonomous Driving USA LLC, Sunnyvale, CA (US)

(72) Inventor: Hang Zhao, Sunnyvale, CA (US)

(73) Assignee: Apollo Autonomous Driving USA LLC, Sunnyvale, CA (US)

( * ) Notice: Subject to any disclaimer, the term of this patent is extended or adjusted under 35 U.S.C. 154(b) by 174 days.

(21) Appl. No.: 18/486,808

(22) Filed: Oct. 13, 2023

(65) Prior Publication Data

US 2025/0121710 A1 Apr. 17, 2025

(51) Int. Cl.
| | |
|---|---|
| *B60L 53/16* | (2019.01) |
| *B60L 53/36* | (2019.01) |
| *B60L 53/65* | (2019.01) |
| *B60L 53/66* | (2019.01) |
| *G06Q 30/04* | (2012.01) |
| *G06Q 50/06* | (2024.01) |

(52) U.S. Cl.
CPC .............. *B60L 53/16* (2019.02); *B60L 53/36* (2019.02); *B60L 53/65* (2019.02); *B60L 53/665* (2019.02); *G06Q 30/04* (2013.01); *G06Q 50/06* (2013.01)

(58) Field of Classification Search
CPC .......... B60L 53/16; B60L 53/36; B60L 53/65; B60L 53/665; G06Q 30/04; G06Q 50/06; Y02T 10/70; Y02T 10/7072; Y02T 90/12
See application file for complete search history.

(56) References Cited

U.S. PATENT DOCUMENTS

| | | | | |
|---|---|---|---|---|
| 2016/0355097 A1* | 12/2016 | Konet | .................... | B60L 53/36 |
| 2018/0272882 A1* | 9/2018 | Fontana | ................. | B60L 53/60 |
| 2019/0176633 A1* | 6/2019 | Booth | .................... | B60L 53/60 |
| 2024/0308359 A1* | 9/2024 | Lee | ......................... | B60L 53/35 |

* cited by examiner

*Primary Examiner* — Michael C Zarroli
(74) *Attorney, Agent, or Firm* — WOMBLE BOND DICKINSON (US) LLP

(57) ABSTRACT

The present disclosure provides a system and method that determines, by a charging station, that a vehicle is aligned to a predetermined charging position. The predetermined charging position is a location at which a first set of electrical contacts on the charging station aligns with a second set of electrical contacts on the vehicle. The system and method deploys, by the charging station, a charging station interlock system that prevents the vehicle from moving in response to determining that the vehicle is aligned to the predetermined charging position. The system and method charges the vehicle using the first set of electrical contacts coupled to the second set of electrical contacts in response to the deploying of the charging station interlock system.

16 Claims, 10 Drawing Sheets

100

300

Sensor System
115

Control System
111

Prediction Module
303

Control Module
306

Routing Module
307

Perception Module
302

Planning Module
305

Vehicle Interlock Module
308

Localization Module
301

Decision Module
304

Memory
351

Mapping Tables
313

Driving/Traffic Rules
312

Map & Route Data
311

Persistent Storage Device
352

Autonomous Driving System (ADS)
110

400

500

System Architecture 500

User Interface
System
113

Application Layer
501

Planning and Control Layer
502

Perception Layer
503

Planning Module
305

Control Module
306

Perception
Module
302

ADS
110

Device Driver(s) Layer
504

Firmware Layer
505

Sensor System
115

Hardware Layer
506

Control System
111

600

Wheel 680

Charging Station
Interlock System
700

Deployed Position 715

Wheel Chocks 645

Retracted Position 710

Underground Enclosure 720

Charging Station
Interlock System
700

Retracted Position 710

800

1000

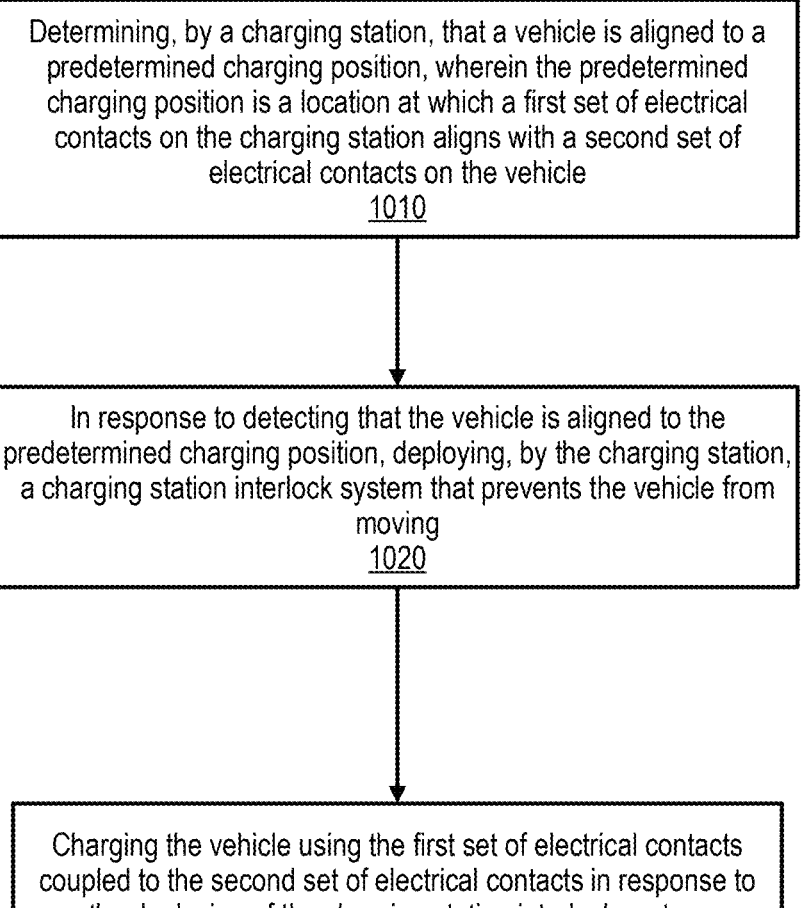

Determining, by a charging station, that a vehicle is aligned to a predetermined charging position, wherein the predetermined charging position is a location at which a first set of electrical contacts on the charging station aligns with a second set of electrical contacts on the vehicle
1010

In response to detecting that the vehicle is aligned to the predetermined charging position, deploying, by the charging station, a charging station interlock system that prevents the vehicle from moving
1020

Charging the vehicle using the first set of electrical contacts coupled to the second set of electrical contacts in response to the deploying of the charging station interlock system
1030

FIG. 10

AUTOMATIC POSITIONING AND INTERLOCK SYSTEM FOR CONDUCTIVE AUTOMATED CONNECTION DEVICE ON THE CHARGING INFRASTRUCTURE

TECHNICAL FIELD

Embodiments of the present disclosure relate generally to electric vehicles. More particularly, embodiments of the present disclosure relate to an automatic positioning and interlock system for a conductive automated connection device on a charging infrastructure.

BACKGROUND

Vehicle charging stations are designed to charge electric vehicles that run on battery-powered electric engines instead of traditional fossil fuels. Electric vehicles, such as electric buses, have been gaining popularity worldwide due to their environmental benefits, including lower emissions and less pollution. The design and functionality of vehicle charging stations for buses vary based on several factors. Some are designed to provide a quick charge during a bus's short layovers in its route, while others are made to charge buses overnight when they are not in service.

A bus charging station typically consists of charging equipment that connects the bus to the electrical grid, such as charging posts or overhead pantographs. Pantograph charging is an approach of charging electric buses in depots or at specific charging stations through an inverted pantograph that is mounted on a charging station mast. Many charging stations today also include sophisticated software to manage the charging process, control the power flow, and monitor the battery's health.

BRIEF DESCRIPTION OF THE DRAWINGS

Embodiments of the disclosure are illustrated by way of example and not limitation in the figures of the accompanying drawings in which like references indicate similar elements.

FIG. 10 is a flow diagram of a method for activating a charging station interlock system while charging a vehicle, in accordance with some embodiments.

DETAILED DESCRIPTION

Figure 1:
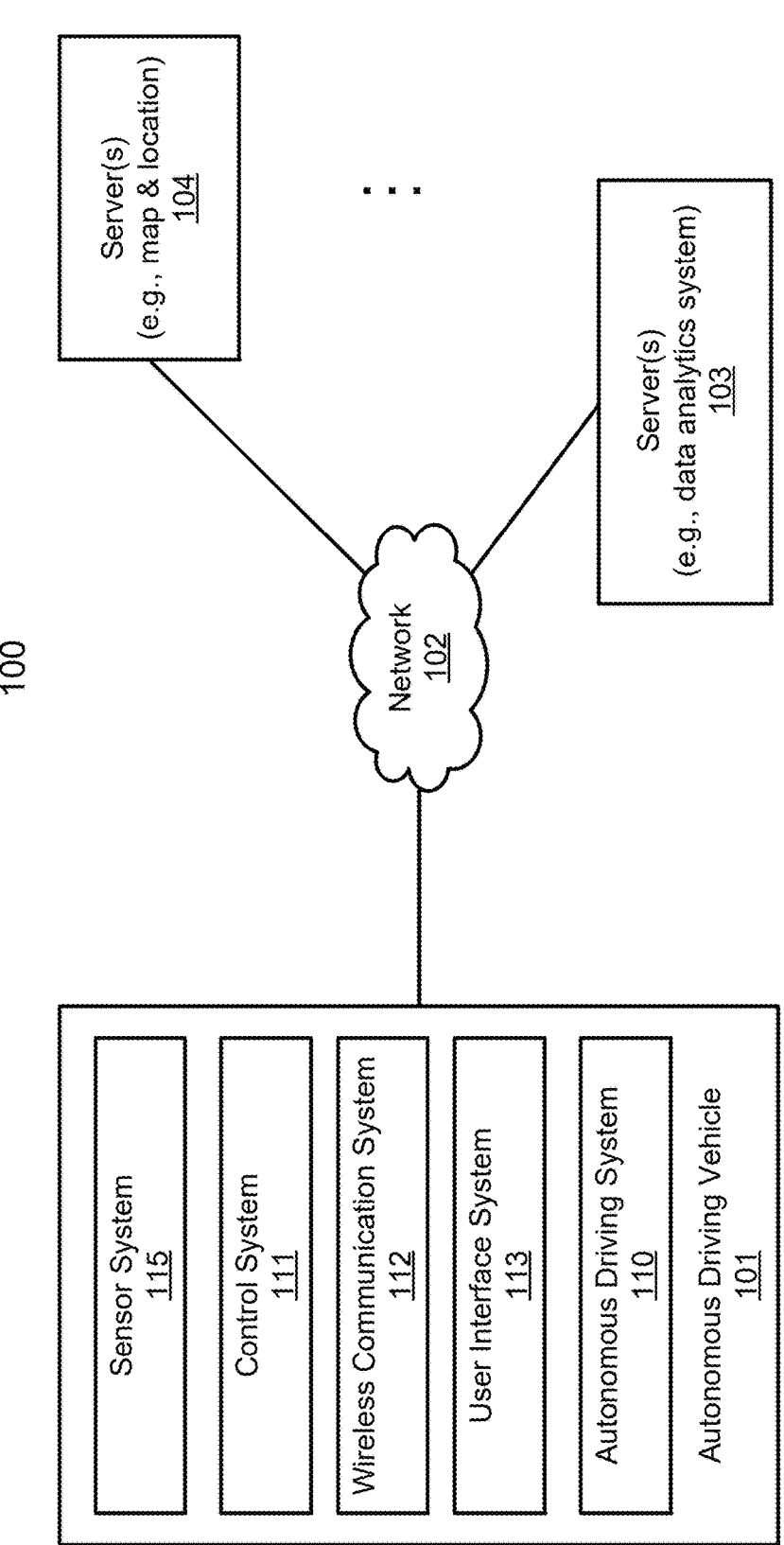
FIG. 1 is a block diagram illustrating a networked system according to one embodiment.

Various embodiments and aspects of the disclosures will be described with reference to the details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As discussed above, a bus charging station typically includes charging equipment that connects the bus to the electrical grid, such as charging posts or overhead pantographs. A challenge found with bus charging stations that use overhead pantographs is that there is no charging station interlock system that prevents the bus from moving while being charged. Stability of the bus during charging is a key consideration, and any movement of the bus while it is connected to the charging station could lead to disconnections, interruptions in the charging process, or even damage to the charging equipment or bus. Keeping a large vehicle stationary, especially in conditions with high winds or on uneven surfaces, is paramount.

Another challenge found is aligning bus electrical contacts with the pantograph electrical contacts. The alignment between the bus and the charging point must be accurate to ensure that the charging process is efficient and safe. Misalignment could lead to inefficient charging, potential damage to the charging equipment or the bus, and even safety risks. Achieving precise alignment can be challenging due to factors such as driver skill/fatigue, bus design, and environmental conditions.

The present disclosure provides an approach that addresses the above-noted and other deficiencies by first determining, by a charging station, that a vehicle is aligned to a predetermined charging position. The predetermined charging position is a location at which a first set of electrical contacts on the charging station aligns with a second set of electrical contacts on the vehicle. Next, the charging station deploys a charging station interlock system that prevents the vehicle from moving in response to determining that the vehicle is aligned to the predetermined charging position. Then, the charging station charges the vehicle using the first set of electrical contacts coupled to the second set of electrical contacts in response to the deploying of the charging station interlock system. In some embodiments, the charging station interlock system is an automatic wheel chock mechanism that deploys from below the vehicle and prevents one or more wheels attached to vehicle from moving.

In some embodiments, in response to deploying the charging station interlock system, the charging station sends a first message from the charging station to the vehicle that instructs the vehicle to activate a vehicle interlock system on the vehicle that prevents the vehicle from moving. In some embodiments, instructing the vehicle to activate the vehicle interlock system causes a body control module of the vehicle to disable kneeling and gear selection functionalities. In some embodiments, instructing the vehicle to activate the vehicle interlock system causes a vehicle controller of the vehicle to limit a power supplied for movement of the vehicle to zero. In some embodiments, the first message is sent from the charging station to a gateway of the vehicle through a charging port at a battery management system of the vehicle.

In some embodiments, the charging station receives vehicle information from the vehicle over an RFID wireless connection. The charging station determines a vehicle type of the vehicle based on the vehicle information, and sets one or more charging parameters to charge the vehicle based on the vehicle type. In some embodiments, the charging station identifies a billing rate and vehicle account based on the vehicle information, and bills the vehicle account to charge the vehicle based on the billing rate.

In some embodiments, the charging station receives a second message at the charging station from the vehicle that the vehicle has completed charging, and retracts the charging station interlock system in response to receiving the second message from the vehicle. In some embodiments, in response to retracting the charging station interlock system, the charging station sends a third message from the charging station to the vehicle to deactivate the vehicle interlock system.

As discussed herein, the present disclosure improves upon the technical field of using overhead pantographs to charge electrical vehicles by ensuring that the electric vehicles are properly aligned and prohibited from moving while being charged, therefore improving safety considerations, and charging efficiency.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. ADV 101, for example, may be an electric bus that uses an overhead pantograph charging station. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired, or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals, or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
FIG. 2 is a block diagram illustrating an example of an autonomous driving vehicle according to one embodiment.
Figure 2:
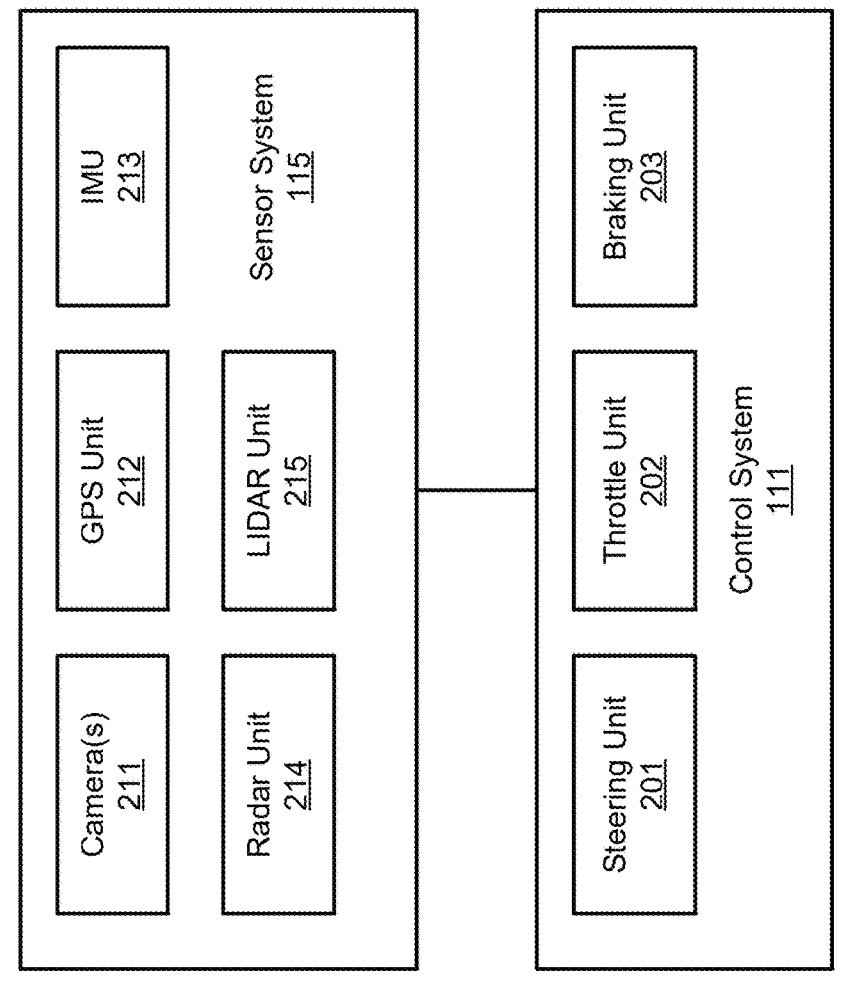

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some embodiments, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. In some embodiments, when a vehicle receives an instruction to activate a vehicle interlock system as discussed herein, the vehicle may use control system 111 to activate the vehicle's brakes and deactivate the vehicle's steering and throttle. Note that the components as shown in FIG. 2 may be implemented in hardware, software, or a combination thereof.

Referring back to FIG. 1, wireless communication system 112 allows communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, RFID, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3:
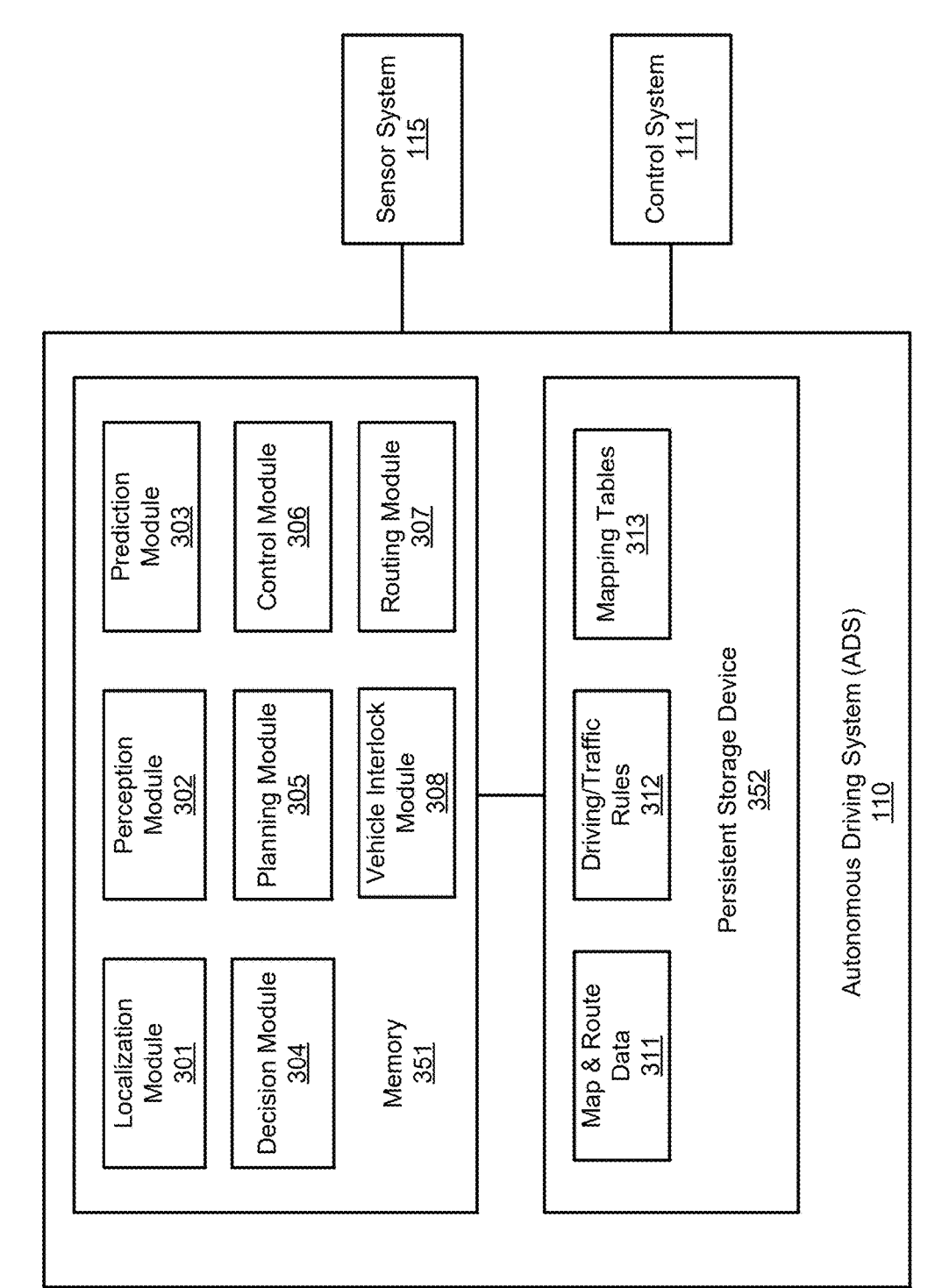
FIGS. 3 and 4 are block diagrams illustrating an example of an autonomous driving system used with an autonomous driving vehicle according to one embodiment.
Figure 4:
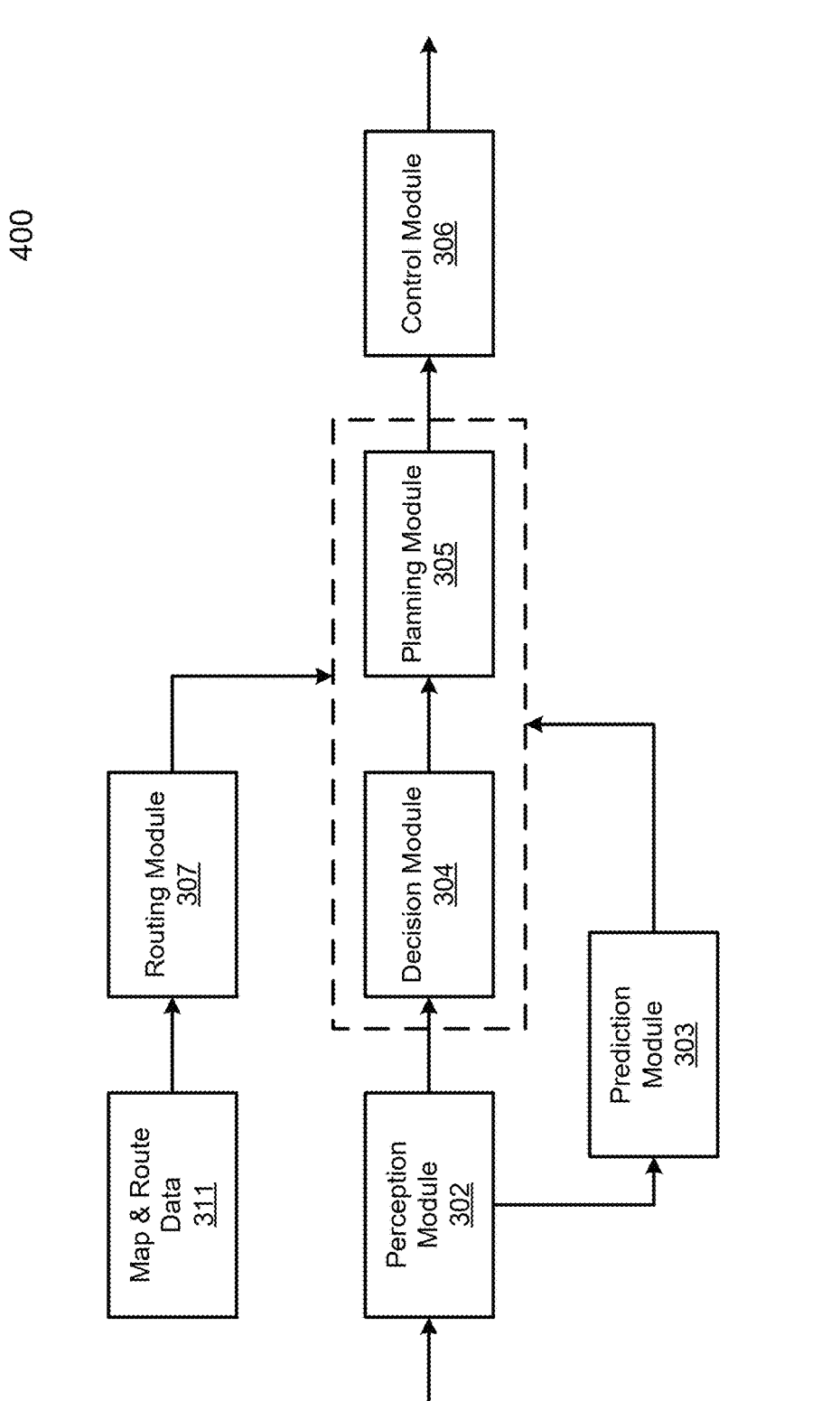

FIGS. 3 and 4 are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. ADS 110 includes, but is not limited to, localization module 301, perception module 302, prediction module 303, decision module 304, planning module 305, control module 306, routing module 307, and vehicle interlock module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn, respectively.

For each of the objects, decision module 304 decides how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Vehicle interlock module 308 may work in conjunction with, or be part of, a vehicle's battery management system (BMS). The BMS is an intelligent system that monitors and manages the charging process, optimizes energy usage, and ensures the health and longevity of the battery, thereby enhancing the performance and operational efficiency of the vehicle. In addition, during vehicle interlock system activation/deactivation, a signal can be sent through the BMS to control the vehicle's kneeling function, gear selection, and zero power output as described herein (see FIG. 9B and corresponding text for further details).

Figure 5:
FIG. 5 is a block diagram illustrating system architecture for autonomous driving according to one embodiment.

FIG. 5 is a block diagram illustrating system architecture for autonomous driving according to one embodiment. System architecture 500 may represent system architecture of an autonomous driving system as shown in FIG. 1. Referring to FIG. 5, system architecture 500 includes, but it is not limited to, application layer 501, planning and control (PNC) layer 502, perception layer 503, driver layer 504, firmware layer 505, and hardware layer 506. Application layer 501 may include user interface or configuration application that interacts with users or passengers of an autonomous driving vehicle, such as, for example, functionalities associated with user interface system 113. PNC layer 502 may include functionalities of planning module 305 and control module 306. Perception layer 503 may include functionalities of at least perception module 302. Firmware layer 505 may represent at least the functionality of sensor system 115, which may be implemented in a form of a field programmable gate array (FPGA). Hardware layer 506 may represent the hardware of the autonomous driving vehicle such as control system 111. Layers 501-503 can communicate with firmware layer 505 and hardware layer 506 via device driver layer 504.

Figure 6:
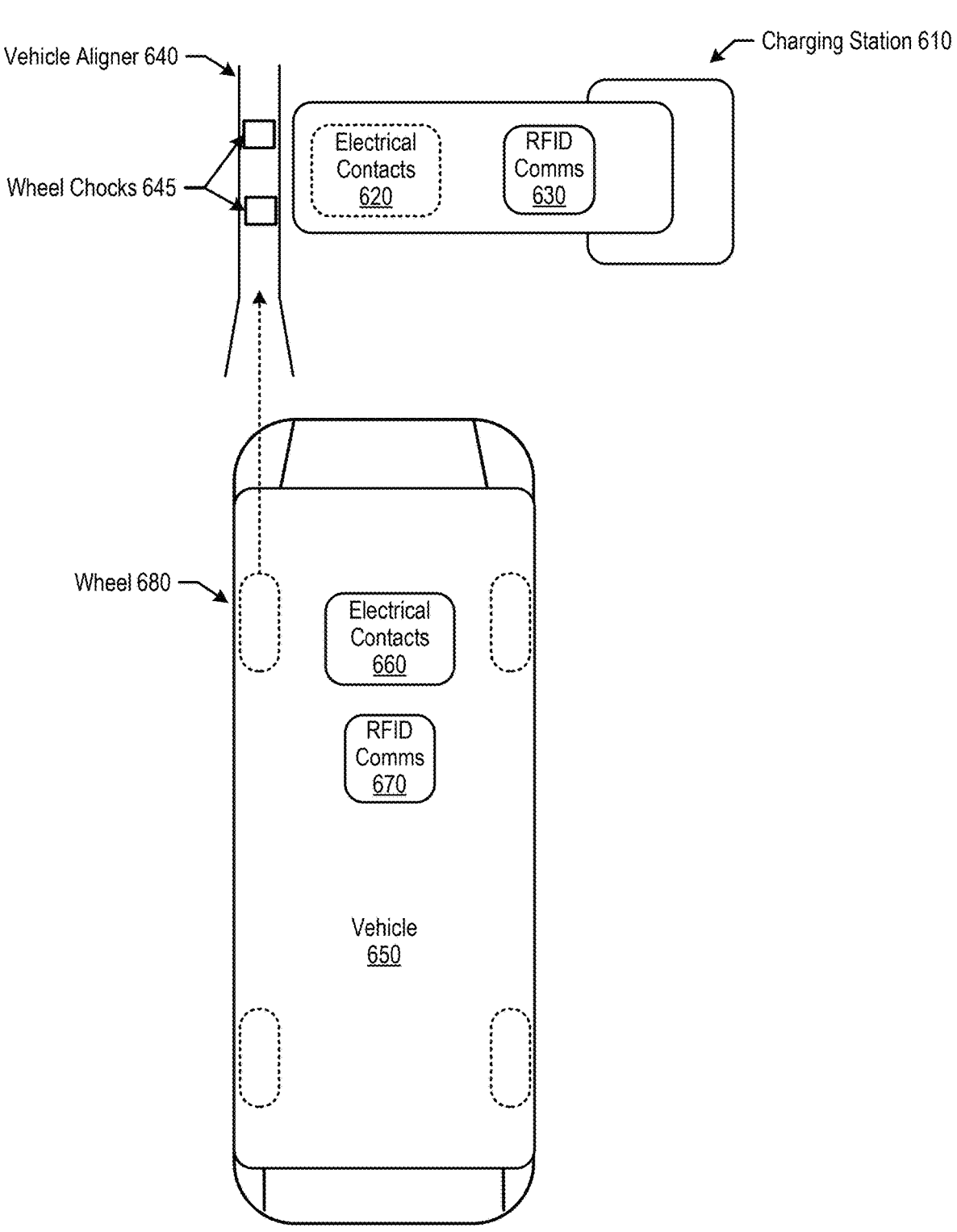
FIG. 6 is a diagram illustrating an example of an automatic positioning and interlock system for a conductive automated connection device on a charging infrastructure, in accordance with some embodiments.

FIG. 6 is a diagram illustrating an example of an automatic positioning and interlock system for a conductive automated connection device on a charging infrastructure, in accordance with some embodiments.

Diagram 600 shows vehicle 650 approaching charging station 610. Charging station 610 includes vehicle aligner 640, which assists vehicle 650 to properly align to a predetermined charging position for charging station 610. Vehicle 650 guides wheel 680 in vehicle aligner 640 to correctly position electrical contacts 620 with electrical contacts 660. When vehicle 650 moves to a predetermined charging position, such as a position where electrical contacts 620 aligns with electrical contact 660, charging station 610 deploys a charging station interlock system that includes wheel chocks 645. Wheel chocks 645 secure wheel 680 and prevents vehicle 650 from moving (see FIGS. 7A, 7B, and corresponding text for further details. In some embodiments, RFID communications 630 communicates with RFID communication 670 on vehicle 650 to receive information about vehicle 650. For example, if vehicle 650 is wider than average, charging station 610 may move electrical contacts 620 from side to side accordingly to align with electrical contact 660, such as when electrical contact 6/20 are part of an overhead pantograph. In one embodiment, RFID communications 630 and/or RFID communications 670 can each include an active RFID reader and a passive RFID tag. The tag of RFID communications 630 can store data such as charging capability, compatibility, location, and charge rate options information for charging station 610. The tag of RFID communications 670 can store information about the vehicle, such as make, model, year, dimension of vehicle, available charging capability and compatibility for vehicle 650.

Once charging station 610 deploys the charging station interlock system (e.g., wheel chocks 645), charging station 610, in some embodiments, sends a message to vehicle 650 that instructs vehicle 650 to activate a vehicle interlock system. The message can be sent via a wireless communication channel between the vehicle and the charging station, such as cellular, WIFI, etc. The vehicle interlock system may place vehicle 650 in park, deactivate gearing, deactivate steering, and turn off power to other vehicle movement mechanisms.

In some embodiments, charging station 610 deploys electrical contacts 620 that can electrically and/or magnetically couple with electrical contacts 660. The message can be sent to the vehicle through electrical contacts 620 to electrical contacts 660 as part of the BMS of the vehicle.

Charging station 610 can charge vehicle 650 through electrical contacts 620 and electrical contacts 660. When vehicle 650 completes charging, or when a predetermined time expires, vehicle 650 sends a message to charging station 610 to terminate charging. In some embodiments, the messages sent between vehicle 650 and charging station 610 are through the RFID communications, or they may be through wired, or other wireless communication mechanisms, such as through a Wi-Fi system, cellular system, etc. (see FIG. 9A and corresponding text for further details).

Charging station 610 receives the message from vehicle 650 and terminates charging. Charging station 610 then retracts wheel chocks 645 and may also send a message to vehicle 650 that instructs vehicle 650 to deactivate the vehicle interlock system for vehicle 650 to drive away from charging station 610.

Figure 7A:
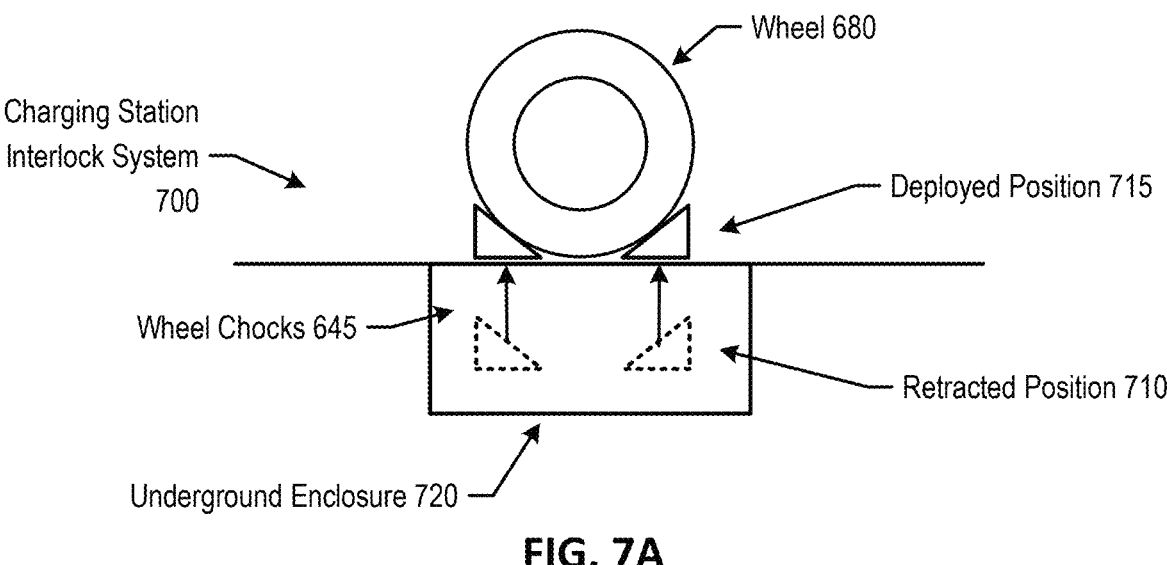
FIG. 7A is a diagram illustrating an example of a charging station interlock system deploying wheel chocks to prevent a vehicle from moving while the charging station charges the vehicle, in accordance with some embodiments.

FIG. 7A is a diagram illustrating an example of a charging station interlock system that deploys wheel chocks to prevent a vehicle from moving while the charging station charges the vehicle, in accordance with some embodiments.

Charging station interlock system 700 includes wheel chocks 645. In some embodiments, wheel chocks 645 stay in retracted position 710 within underground enclosure 720 until vehicle 650 aligns to a predetermined charging position as described herein. When this occurs, wheel 680 is in a correct position and charging station interlock system 700 deploys wheel chocks 645 to deployed position 715. Deployed position 715 prevents wheel 680 from moving which, in turn, prevents vehicle 650 from moving while being charged. In some embodiments, charging station interlock system 700 deploys wheel chock for multiple vehicle wheels, such as for the front two wheels, all four wheels, etc.

Figure 7B:
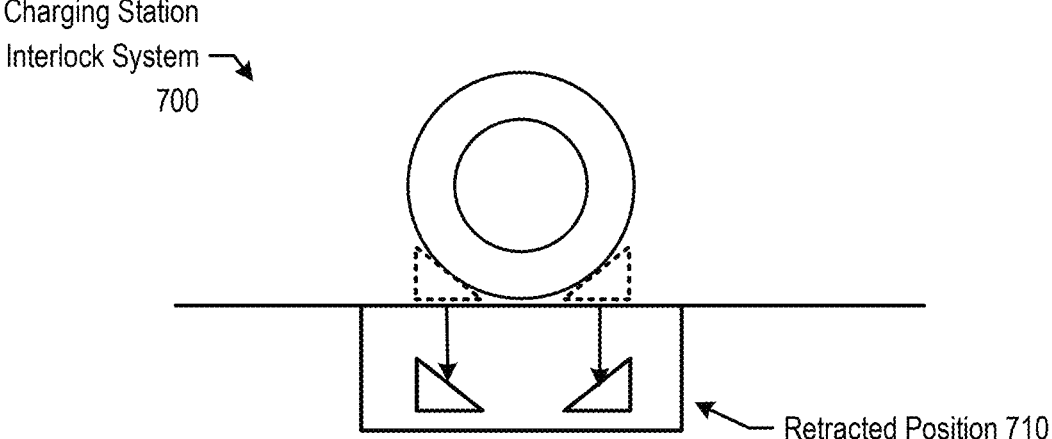
FIG. 7B is a diagram illustrating an example of a charging station interlock system retracting wheel chocks after charging the vehicle, in accordance with some embodiments.

FIG. 7B is a diagram illustrating an example of a charging station interlock system that retracts wheel chocks after charging the vehicle, in accordance with some embodiments.

When charging station 610 terminates charging, charging station 610 instructs charging station interlock system 700 to retract wheel chocks 645 to retracted position 710. As such, wheel 680 is free to move and vehicle 650 is free to pull away from charging station 610. In some embodiments, after retracting wheel chocks 645, charging station 610 may send a message to vehicle 650 to deactivate a vehicle interlock system that may have been previously activated as discussed herein.

Figure 8:
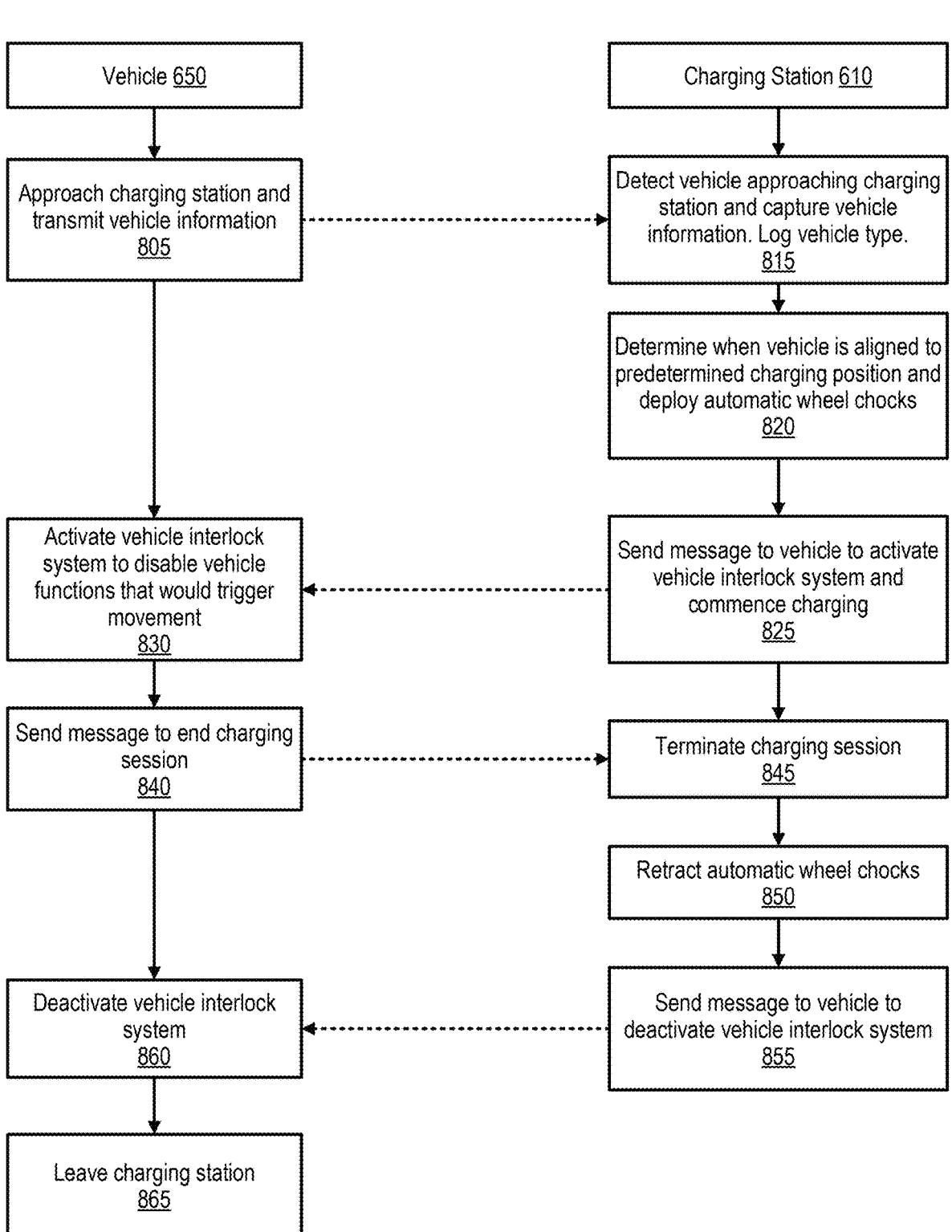
FIG. 8 is a flow of a method for a charging station communicating with a vehicle and activating a charging station interlock system while charging the vehicle, in accordance with some embodiments.

FIG. 8 is a flow of a method for a charging station communicating with a vehicle and activating a charging station interlock system while charging the vehicle, in accordance with some embodiments.

Method 800 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by control system 111, vehicle 650's subsystems/modules shown in FIG. 9A, charging station 610's subsystems/modules shown in FIG. 9A, or a combination thereof.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

With reference to FIG. 8, method 800 begins at block 805, wherein vehicle 650 approaches charging station 610 and vehicle processing logic transmits vehicle information to the charging station, such as by using RFID communications 670. At block 815, charging station processing logic detects vehicle 650 approaching, captures the vehicle information, and logs the vehicle information, which may include a vehicle type, a vehicle account (e.g., client account, customer account, company account, etc.), or a combination thereof.

At block 820, charging station processing logic determines that the vehicle is aligned to the predetermined charging position and deploys automatic wheel chocks (see FIG. 7A and corresponding text for further details). At block 825, in some embodiments, charging station processing logic sends a message to the vehicle that instructs the vehicle to activate its vehicle interlock system and commences charging vehicle 650. In some embodiments, charging station processing logic waits to receive an indication from vehicle 650 that vehicle 650 activated the vehicle interlock system.

At block 830, vehicle processing logic activates the vehicle interlock system, which disables vehicle functions that would trigger movement as discussed herein. At block 840, vehicle processing logic sends a message to the charging station to terminate the charging session, which may be based on a time duration, an amount of charge, or a combination thereof.

At block 845, charging station processing logic terminates the charging session and removes power from the contacts. At block 850, charging station processing logic retracts the automated wheel chocks (see FIG. 7B and corresponding text for further details) and, at block 855, charging station processing logic sends a message to the vehicle to deactivate the vehicle interlock system.

At block 860, vehicle processing logic disables the vehicle interlock system, and at block 865, the vehicle leaves the charging station.

Figures 9A, 9B:
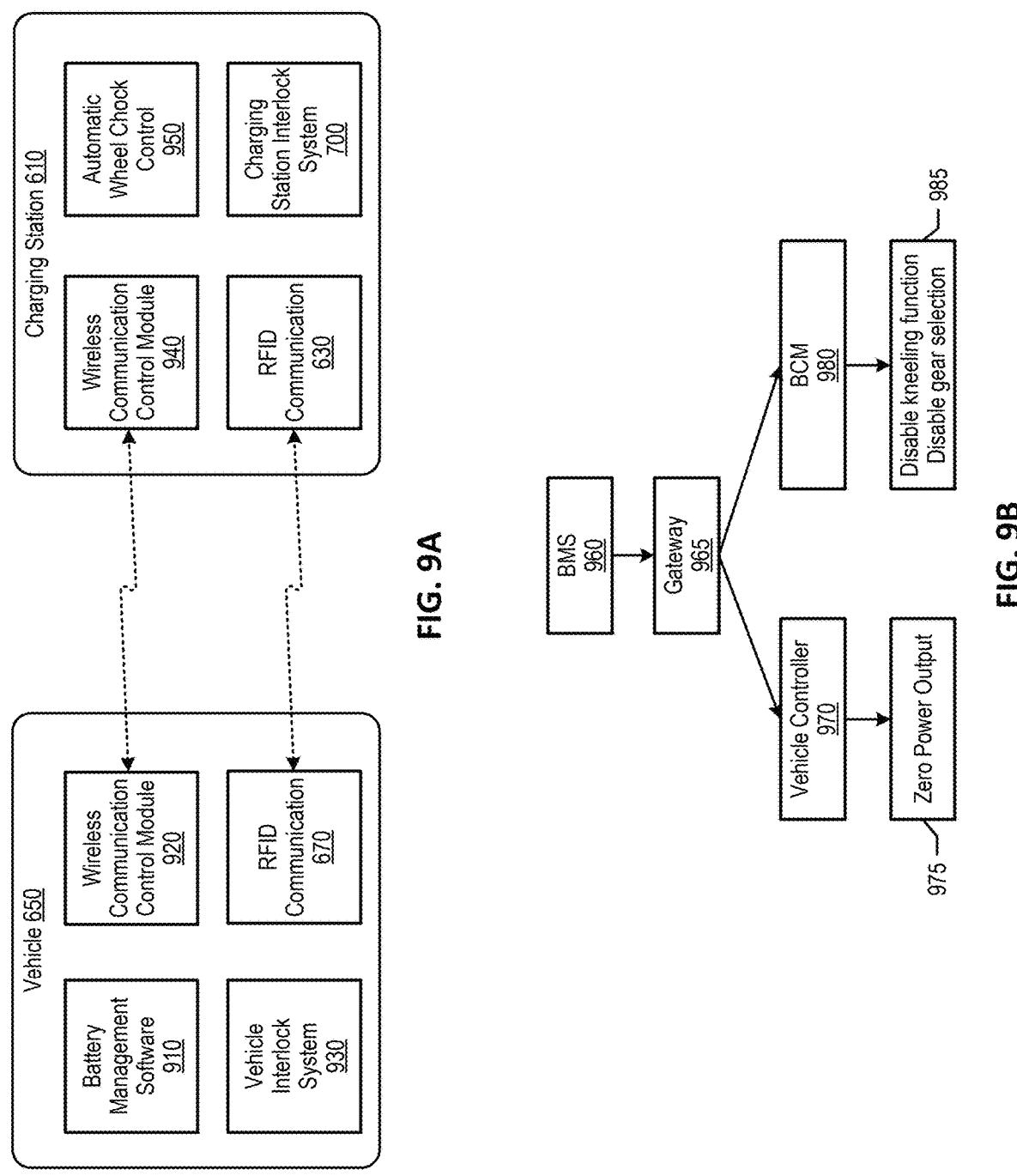
FIG. 9A is a block diagram illustrating an example vehicle system and charging station system, in accordance with some embodiments.
FIG. 9B is a block diagram that shows a communication signal to activate a vehicle interlock system according to some embodiments

FIG. 9A is a block diagram illustrating an example vehicle system and charging station system, in accordance with some embodiments.

Battery management system (BMS). The BMS is an intelligent system that monitors and manages the charging process, optimizes energy usage, and ensures the health and longevity of the battery, thereby enhancing the performance and operational efficiency of the vehicle. In addition, during vehicle interlock system activation/deactivation, a signal can be sent through the BMS to control the vehicle's kneeling function, gear selection, and zero power output as described herein.

FIG. 9A shows subsystems and modules in vehicle 650 and charging station 610. Vehicle 650 includes battery management system (BMS) 910, wireless communication control module 920, vehicle interlock system 930, and RFID communication 670. Charging station 610 includes wireless communication control module 940, RFID communication 630, automatic wheel chock control 950, and charging station interlock system 700.

On vehicle 650, BMS 910 monitors and manages the charging process of vehicle 650, optimizes energy usage, and ensures the health and longevity of vehicle 650's battery, thereby enhancing the performance and operational efficiency of the vehicle. In addition, during vehicle interlock system activation/deactivation, BMS 910 can receive a signal from charging station. The signal can be sent to the gateway, which in turn is sent to the vehicle controller and/or body control module (BCM) of the vehicle, as part vehicle interlock system 930. The signal can enable/disable the vehicle's kneeling function, gear selection, and limit the vehicle movement to zero power output. In another embodiment, the signal can be received wirelessly through wireless communication control module 920. Wireless communication control module 920 may be, for example, a Wi-Fi transceiver that communicates with wireless communication control module 940 on charging station 610. Wireless communication control module 920 may also be a cellular network-based control module that communicates with charging station 610 through a wireless network. RFID communication 670 maybe a transceiver that communicates with RFID communication 630 on charging station 610. Vehicle information is sent through RFID communication 670, wireless communication control module 920, or a combination thereof. Charging station 610 also includes charging station interlock system 700 and automatic wheel chock control 950. Charging station interlock system 700 communicates with automatic wheel chock control 950 as discussed herein to deploy and retract wheel chocks at appropriate times.

FIG. 9B is a block diagram that shows a communication signal to activate vehicle interlock system 930 according to some embodiments.

When vehicle 650 receives a message to activate the vehicle interlock system, battery management system (BMS) 960 communicates through gateway 965 to i) instruct vehicle controller 970 to activate zero power output 975; and ii) instruct body control module (BCM) 980 to disable the vehicle's kneeling function (lowering vehicle) and gear selection 985. When vehicle 650 receives a message to deactivate the vehicle interlock system after charging, BMS 960 communicates through gateway 965 to i) instruct vehicle controller 970 to deactivate zero power output 975; and ii) instruct BCM 980 to enable the vehicle's kneeling function and gear selection 985.

FIG. 10 is a flow diagram of a method for activating a charging station interlock system while charging a vehicle, in accordance with some embodiments Method 1000 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by wireless communication control module 940, RFID communication 630, automatic wheel chock control 950, charging station interlock system 700, or a combination thereof.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

With reference to FIG. 10, method 1000 begins at block 1010, wherein processing logic, determines, by a charging station, that a vehicle is aligned to a predetermined charging position, wherein the predetermined charging position is a location at which a first set of electrical contacts on the charging station aligns with a second set of electrical contacts on the vehicle. In some embodiments, the charging station receives vehicle information from the vehicle over an RFID wireless connection. The charging station determines a vehicle type of the vehicle based on the vehicle information, and sets one or more charging parameters to charge the vehicle based on the vehicle type.

At block 1020, processing logic deploys, by the charging station, a charging station interlock system that prevents the vehicle from moving in response to determining that the vehicle is aligned to the predetermined charging position. In some embodiments, the charging station interlock system is an automatic wheel chock mechanism that deploys from below the vehicle and prevents one or more wheels attached to vehicle from moving. In some embodiments, in response to deploying the charging station interlock system, the charging station sends a first message from the charging station to the vehicle that instructs the vehicle to activate a vehicle interlock system on the vehicle that prevents the vehicle from moving.

At block 1030, processing logic charges the vehicle using the first set of electrical contacts coupled to the second set of electrical contacts in response to the deploying of the charging station interlock system. In some embodiments, the charging station identifies a billing rate and vehicle account based on the vehicle information, and bills the vehicle account to charge the vehicle based on the billing rate.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method comprising:

determining, by a charging station, that a vehicle is aligned to a predetermined charging position, wherein the predetermined charging position is a location at which a first set of electrical contacts on the charging station aligns with a second set of electrical contacts on the vehicle;

deploying, by the charging station, a charging station interlock system that prevents the vehicle from moving in response to determining that the vehicle is aligned to the predetermined charging position;

in response to deploying the charging station interlock system, sending a first message from the charging station to the vehicle that instructs the vehicle to activate a vehicle interlock system on the vehicle that prevents the vehicle from moving, wherein instructing the vehicle to activate the vehicle interlock system comprises causing a vehicle controller of the vehicle to limit a power supplied for movement of the vehicle to zero; and charging the vehicle using the first set of electrical contacts coupled to the second set of electrical contacts in response to the deploying of the charging station interlock system.

2. The method of claim 1, further comprising:

receiving a second message at the charging station from the vehicle that the vehicle has completed charging; and retracting, by the charging station, the charging station interlock system in response to receiving the second message from the vehicle.

3. The method of claim 2, further comprising:

in response to retracting the charging station interlock system, sending a third message from the charging station to the vehicle to deactivate the vehicle interlock system.

4. The method of claim 1, wherein the first message is sent from the charging station to a gateway of the vehicle through a charging port at a battery management system of the vehicle.

5. The method of claim 1, wherein instructing the vehicle to activate the vehicle interlock system comprises causing a body control module of the vehicle to disable kneeling and gear selection functionalities.

6. The method of claim 1, further comprising:

receiving vehicle information at the charging station from the vehicle over an RFID wireless connection;

determining, by the charging station, a vehicle type of the
vehicle based on the vehicle information; and setting, by the charging station, one or more charging
parameters to charge the vehicle based on the vehicle
type.

7. The method of claim 6, further comprising:

identifying, by the charging station, a billing rate and
vehicle account based on the vehicle information; and billing the vehicle account to charge the vehicle based on
the billing rate.

8. The method of claim 1, wherein the charging station
interlock system is an automatic wheel chock mechanism
that deploys from below the vehicle and prevents one or
more wheels attached to vehicle from moving.

9. A system operating as part of a charging station,
comprising:

a processing device; and a memory to store instructions that, when executed by the
processing device cause the processing device to:

determine that a vehicle is aligned to a predetermined
charging position, wherein the predetermined charg-
ing position is a location at which a first set of
electrical contacts on the charging station aligns with
a second set of electrical contacts on the vehicle;

deploy a charging station interlock system that prevents
the vehicle from moving in response to determining
that the vehicle is aligned to the predetermined
charging position;

send a first message from the charging station to the
vehicle that instructs the vehicle to activate a vehicle
interlock system on the vehicle that prevents the
vehicle from moving in response to deploying the
charging station interlock system, wherein instruct-
ing the vehicle to activate the vehicle interlock
system causes a vehicle controller of the vehicle to
limit a power supplied for movement of the vehicle
to zero; and charge the vehicle using the first set of electrical
contacts coupled to the second set of electrical
contacts in response to the deploying of the charging
station interlock system.

10. The system of claim 9, wherein the processing device
further to:

receive a second message at the charging station from the
vehicle that the vehicle has completed charging;

retract the charging station interlock system in response to
receiving the second message from the vehicle; and send a third message to the vehicle to deactivate the
vehicle interlock system in response to retracting the
charging station interlock system.

11. The system of claim 9, wherein instructing the vehicle
to activate the vehicle interlock system comprises causing a
body control module of the vehicle to disable kneeling and
gear selection functionalities.

12. The system of claim 9, wherein the processing device
further to:

receive vehicle information at the charging station from
the vehicle over an RFID wireless connection;

determine a vehicle type of the vehicle based on the
vehicle information;

set one or more charging parameters to charge the vehicle
based on the vehicle type;

identify a billing rate and vehicle account based on the
vehicle information; and bill the vehicle account to charge the vehicle based on the
billing rate.

13. The system of claim 9, wherein the charging station
interlock system is an automatic wheel chock mechanism
that deploys from below the vehicle and prevents one or
more wheels attached to vehicle from moving.

14. A non-transitory machine-readable medium having
instructions stored therein, which when executed by a pro-
cessor, cause a charging station to:

determine that a vehicle is aligned to a predetermined
charging position, wherein the predetermined charging
position is a location at which a first set of electrical
contacts on the charging station aligns with a second set
of electrical contacts on the vehicle;

deploy a charging station interlock system that prevents
the vehicle from moving in response to determining
that the vehicle is aligned to the predetermined charg-
ing position;

send a first message from the charging station to the
vehicle that instructs the vehicle to activate a vehicle
interlock system on the vehicle that prevents the
vehicle from moving in response to deploying the
charging station interlock system, wherein instructing
the vehicle to activate the vehicle interlock system
causes a vehicle controller of the vehicle to limit a
power supplied for movement of the vehicle to zero;
and charge the vehicle using the first set of electrical contacts
coupled to the second set of electrical contacts in
response to the deploying of the charging station inter-
lock system.

15. The non-transitory machine-readable medium of
claim 14, wherein the charging station is further to:

receive a second message at the charging station from the
vehicle that the vehicle has completed charging;

retract the charging station interlock system in response to
receiving the second message from the vehicle; and send a third message to the vehicle to deactivate the
vehicle interlock system in response to retracting the
charging station interlock system.

16. The non-transitory machine-readable medium of
claim 14, wherein the charging station is further to:

receive vehicle information at the charging station from
the vehicle over an RFID wireless connection;

determine a vehicle type of the vehicle based on the
vehicle information;

set one or more charging parameters to charge the vehicle
based on the vehicle type;

identify a billing rate and vehicle account based on the
vehicle information; and bill the vehicle account to charge the vehicle based on the
billing rate.

* * * * *